(No Model.)

J. W. COOPER.
SAW COTTON GIN.

No. 562,363.

Patented June 16, 1896.

Witnesses.
A. Ruppert
H. A. Daniels

Inventor.
James W. Cooper
Per
Thomas P. Simpson
Atty

UNITED STATES PATENT OFFICE.

JAMES WITHERSPOON COOPER, OF MAYESVILLE, SOUTH CAROLINA.

SAW COTTON-GIN.

SPECIFICATION forming part of Letters Patent No. 562,363, dated June 16, 1896.

Application filed October 22, 1895. Serial No. 566,480. (No model.)

*To all whom it may concern:*

Be it known that I, JAMES WITHERSPOON COOPER, a citizen of the United States, residing at Mayesville, in the county of Sumter and State of South Carolina, have invented certain new and useful Improvements in Saw Cotton-Gins; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to enable an ordinary sixty-saw gin to work conveniently and advantageously with a much greater number of saws, so as greatly to increase the output of a gin without materially increasing the expense.

Figure 1:
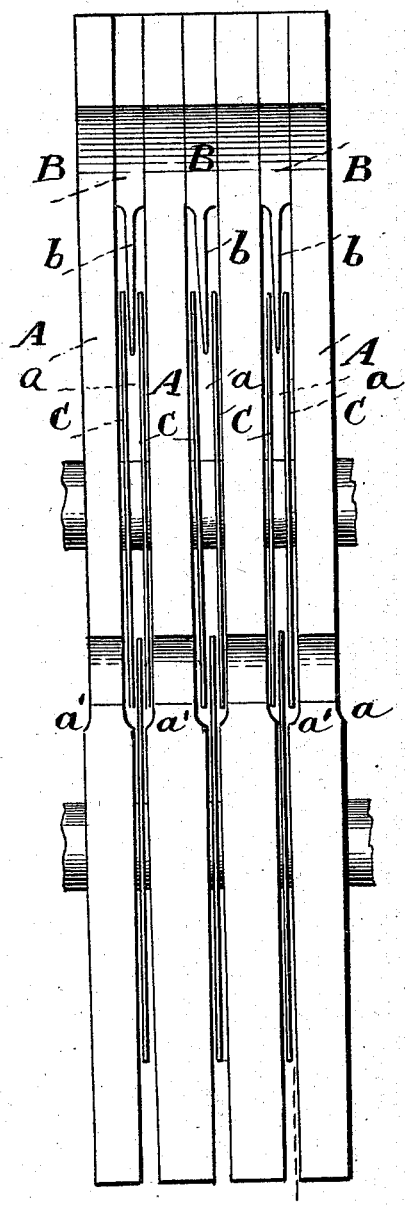
Figure 2:
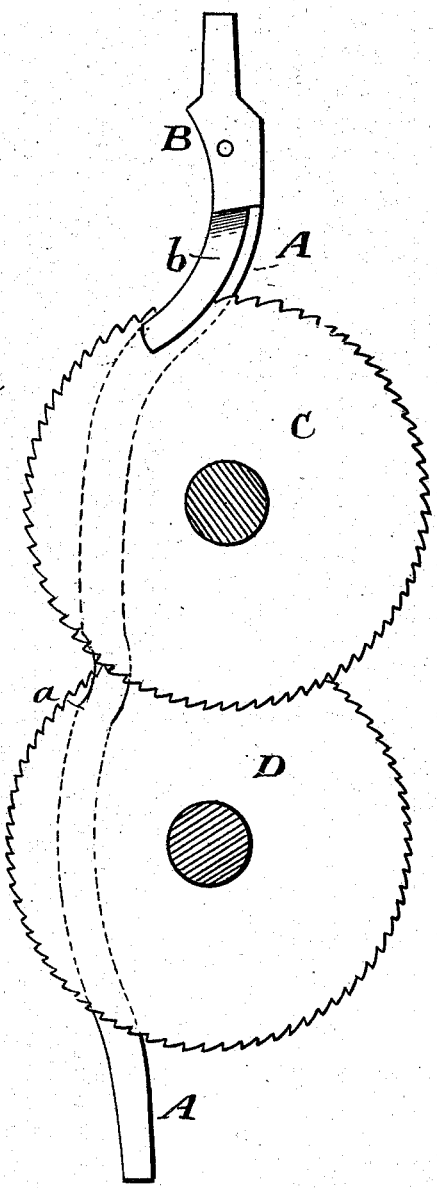
Figure 3:
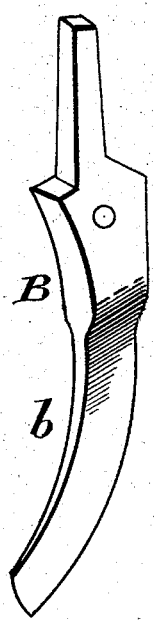

Figure 1 of the drawings is a front elevation; Fig. 2, a vertical section on line $x\ x$ of Fig. 1, and Fig. 3 a detail view of the short rib.

In the drawings, A represents the gin-ribs, which are in pairs, each shaped at the front and rear in the ordinary way, but the two of each pair cut out at $a\ a$ on their opposite faces.

B is a short rib whose shank I fasten between and to the long ribs A A, while a blade $b$ projects between the upper parts of the two upper saws C C, at an equal distance from each. The distance between the lower halves of the ribs A A from the point $a$ is made sufficient for the accommodation of one saw D, or the ribs A A may diverge slightly from the point $a'$. Thus it will be seen that, with the same number of ribs as are used in an ordinary sixty-saw gin, I conveniently employ one hundred and fifty saws and do more than double the usual quantity of work by the trio system.

In experimenting with my interlapping trio of saws, I also find that they make a superior quality of lint, which is more acceptable to buyers.

This arrangement of saws can be put in any gin without disarranging any part thereof, so that the number of saws may be increased in any desired number above sixty, the maximum being one hundred and fifty.

Having thus described all that is necessary to a full understanding of my invention, what I claim as new is—

A cotton-gin having pairs of ribs A A, two upper saws C C on the same shaft between said ribs, a short rib B between said saws, and a lower shaft-saw D to each pair of the saws C, C, said saw D working interlappingly between the saws C C as shown and for the purpose set forth.

In testimony whereof I affix my signature in presence of two witnesses.

JAMES WITHERSPOON COOPER.

Witnesses:
J. E. STEVENSON,
M. P. MAYES, Jr.